2,778,826

PREPARATION OF BASIC NITROGEN COMPOUNDS

Claude J. Schmidle, Moorestown, N. J., assignor to Rohm & Haas Company, Philadelphia, Pa., a corporation of Delaware No Drawing. Application April 26, 1954, Serial No. 425,713

10 Claims. (Cl. 260—247)

This invention concerns a process for preparing basic nitrogen compounds. It deals with a process wherein olefinically unsaturated compounds, particularly hydrocarbons are reacted with formaldehyde and a secondary amine. This invention also deals with various novel compounds which result from this reaction.

This application is a continuation-in-part of my application Serial No. 240,979, filed August 8, 1951, now abandoned.

In U. S. Patent 2,647,117 of July 28, 1953, to Hartough et al. it is shown that the reaction of primary amine hydrohalides, formaldehyde, and olefins gives tetrahydro-1,3-oxazines. As shown in Example 15 of this patent, however, reaction failed to occur when dimethylamine hydrochloride was substituted for primary methylamine hydrochloride in the reaction with formaldehyde and an olefin, the entire initial charge of olefin being recovered.

I have found it to be true that secondary amines fail to react with formaldehyde and olefins in the presence of hydrochloric or hydrobromic acid as catalyst. I have also found that the reaction of primary amines with formaldehyde and olefins is not generally catalyzed by other than hydrohalides. This fact also holds for the comparable reaction with ammonia.

I have, however, discovered that the reaction of secondary amines, formaldehyde, and olefinically unsaturated hydrocarbons having a vinylidene group is promoted by certain specific acids. These are sulfuric acid, phosphoric acid, sulfonated cation-exchange resins in hydrogen form, mixtures of these acids with acetic acid, and sulfonic acids. These acids have not been found effective in the Hartough reactions.

The acids which promote the desired reaction of secondary amine, formaldehyde, and olefin are not only the above mentioned sulfuric and phosphoric acids but also alkanesulfonic acids, such as butanesulfonic acid, ethanesulfonic acids, and the commercial mixtures of lower alkanesulfonic acids, arylsulfonic acids, such as benzenesulfonic acid and p-toluenesulfonic acid, and complex phosphoric acids. Strongly acidic exchange resins include cross-linked polystyrene sulfonates, sulfonated coal, and phenol-formaldehyde sulfonates.

If desired, the acid catalyst may be mixed with a secondary amine to form an amine salt. For example, dimethylamine hydrogen phosphate may be used to supply both secondary amine and acid catalyst. The effective acids may, however, be added in their free form to the reaction mixture.

The acid catalyst is ordinarily used in an amount which is about equivalent to the amino nitrogen of the secondary amine. Less acid may be used with a possible decrease in yield of final product. More acid can be used without harming the outcome of the reaction. In cases, however, in which acid serves as a catalyst for polymerizing the olefin, it is, of course, best to avoid free acid.

As olefinically unsaturated compounds, the most important are hydrocarbons having a vinylidene group, R—CR'=CH2, where individually R is hydrogen or an alkyl, aryl, aralkyl, or cycloaliphatic hydrocarbon group and R' is hydrogen or an alkyl group of one to four carbon atoms, and when R and R' are taken together, they form a carbocycle in conjunction with the carbon atom carrying the double bond. Typical compounds are ethylene, propene, 1-butene, isobutene, isoamylene, diisobutylene, triiosbutylene, polypropylenes having 6, 9, 12, 15 or 18 carbon atoms per molecule, butadiene, isoprene, allylbenzene, styrene, α-methylstyrene, α-ethylstryrene, vinylnaphthalene, p-methylstyrene, and other alkylstyrenes, p-alkyl-α-alkylstyrenes, isopropenylphenanthrenes, isopropenylnaphthalenes, acenaphthalene, divinylbenzene, 2-phenylbutenes, phenylbutadienes, methylene cyclohexane, terpenes such as dipentene, camphene, or α- or β-pinene, cyclopentadiene, dicyclopentadiene, cyclohexene, phenylcyclohexene, phenylcyclopentene, etc.

As useful secondary amines there may be used any of the amines of the formula

where $R^0$ is an alkyl, alkenyl, aralkyl, or cycloalkyl group and $R^x$ is an alkyl, alkenyl, aralkyl, or cycloalkyl group, when $R^0$ and $R^x$ are taken individually, or when they are taken together, $R^0$ and $R^x$ compose a divalent chain which with the amino nitrogen forms a heterocycle as in morpholine, methylmorpholines, thiamorpholine, piperidine, pyrrolidine, or N-alkylpiperazines. These divalent chains are basically —CH2CH2OCH2CH2—, —CH2CH2SCH2CH2—, —CH2CH2CH2CH2CH'2—, —CH2CH2CH2CH2—, and

—CH2CH2N(CH3)CH2CH2—, but these chains may also carry alkyl substituents. The useful amines also include secondary amines which contain inert substituents other than hydrocarbon. In fact some of the most interesting and valuable products are prepared from such substituted secondary amines. In general any secondary amine can be used in which the —NH group is the sole group reacting with formaldehyde.

Typical examples of useful secondary amines include dimethylamine, diethylamine, dipropylamine, dibutylamine, diamylamine, dioctylamine, didodecylamine, octylmethylamine, dodecylmethylamine, diallylamine, dicrotylamine, didodecenylamine, dodecenylmethylamine, dibenzylamine, benzylmethylamine, dicyclopentylamine, dicyclohexylamine, dihydroxyethylamine, hydroxyethylmethylamine, dihydroxypropylamine, dimethoxyethylamine, bis(dimethylaminoethyl)amine, morpholine, thiamorpholine, 3,5-dimethylmorpholine, pyrrolidine, piperidine, methylpiperidines, or N-methylpiperazine.

Formaldehyde may be used in the form of aqueous solutions, of solutions in alcohols, where it may exist as the form of hemiformals, or of revertible polymers. Usually the amount of formaldehyde used is about molecularly proportional to amine and unsaturated hydrocarbon.

Formaldehyde and secondary amine may be reacted, if desired, in advance to give a compound from which water may be eliminated. There may thus be used such compounds as methylenebis(dimethylamine) or methylenebis(diethylamine).

Reaction of olefinically unsaturated hydrocarbon, formaldehyde, and secondary amine may be carried out by mixing these reactants in any desired order and effecting the reaction in the presence of a prescribed catalyst with or without a solvent. Aqueous solutions or solutions in inert organic solvents may be used. Glacial acetic acid is a particularly useful solvent as well as catalytic adjuvant. Other solvents include dioxane, isopropyl ether.

naphthas, benzene, toluene, nitrobenzene, methanol, ethanol, isopropanol, butanol, methoxyethanol, ethoxyethanol, ethoxyethoxyethanol, ethylene glycol, and other alcoholic solvents and other solvents inert toward the reactants.

The reaction is carried out at temperatures of 50° to 150° C. The reaction mixture is worked up desirably with removal, as by extraction, of unreacted olefinic compound and separation of acidic catalyst. In many cases the reaction product can be purified by distillation. When product is collected as a residue, it may be purified by extraction, or through solution of the product as an acid salt followed by release of the basic nitrogen compound through neutralization of the acid group, or with the aid of charcoaling, etc.

In the following illustrative examples typical preparations are described. Parts shown are by weight.

*Example 1*

(A) A mixture of 59 parts of α-methylstyrene and 52 parts of N,N,N',N'-tetramethylmethylenediamine (formed by the condensation of two moles of dimethylamine with one mole of formaldehyde) was slowly added to 200 parts of glacial acetic acid. To the resulting mixture was added 25 parts of 85% orthophosphoric acid. The reaction mixture was heated with reflux for four hours, cooled, and poured into 750 parts of water. Acid-insoluble material, including unreacted α-methylstyrene, was separated with benzene by three extractions of the aqueous mixture, which was then rendered alkaline by addition of a 20% sodium hydroxide solution. An oil separated and was collected with the aid of benzene. The organic layer was separated and distilled. At 128°–138° C./25–30 mm. a fraction of 54 parts of phenyldimethylaminobutene was obtained. It had a refractive index, $n_D^{20}$, of 1.5229 and a specific gravity, $$d_{16°}^{20°}$$

of 0.920. The product contained by analysis 82.22% of carbon, 10.01% of hydrogen, and 7.99% of nitrogen. Theoretical values are 82.23%, 9.78%, and 7.99%, respectively. From infrared data the structure of this product appears to be

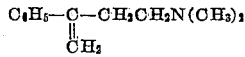

$$C_6H_5-C-CH_2CH_2N(CH_3)_2$$
$$\phantom{C_6H_5-C-}\|$$
$$\phantom{C_6H_5-}CH_2$$

The same type of structure is observed when the dimethylamine is replaced with larger amines, such as dibutylamine, diallylamine, dihydroxypropylamine, dicyclopentylamine, morpholine, piperidine, and so on. These compounds are potent inhibitors for decreasing attack of acids on metals.

(B) The above material was subjected to hydrogenation by the following procedure. A portion of 75 parts of phenyldimethylaminobutene was dissolved in 95% ethanol to a total of 250 parts by volume. Thereto was added seven grams of Raney nickel. The mixture was hydrogenated at 105° C. and 1400 p. s. i. One mole of hydrogen was taken up per mole of reacting compound. The reaction vessel was cooled and vented. The nickel was separated by filtration. The filtrate was poured into 1000 parts of water. An oil separated and was taken up in benzene. The benzene layer was separated and washed with 500 parts of an aqueous 10% sulfuric acid solution. The aqueous layer was taken and made alkaline with 50% sodium hydroxide solution. The oil which formed was taken up in benzene and separated. The benzene solution was washed with water and dried over sodium sulfate. It was then distilled. At 110°–113° C./20 mm. there was obtained a fraction of N,N-dimethyl-3-phenyl-n-butylamine. It had a refractive index, $n_D^{20}$, of 1.4962 and a density of 0.888. It contained by analysis 81.10% of carbon, 10.85% of hydrogen, and 7.83% of nitrogen. The corresponding theoretical values for this compound are 81.30%, 10.80%, and 7.90%.

*Example 2*

There were mixed with stirring and cooling 72 parts of diethylamine and 32 parts of paraformaldehyde. Thereto, also with cooling, there was added a mixture of 400 parts of glacial acetic acid and 40 parts of 85% orthophosphoric acid. There was then added α-methylstyrene in an amount of 118 parts. The reaction mixture was heated under reflux for five hours. It was cooled and mixed with 500 parts of water. The aqueous mixture was extracted four times with 250 part portions of benzene. The aqueous solution was made alkaline with 50% sodium hydroxide solution. An oil separated and was taken up with benzene. The benzene layer was taken and dried over sodium sulfate. It was subjected to distillation. At 145°–146° C./25 mm. there was obtained a fraction of 66 parts of N,N-diethylamino-3-phenyl-3-butene. It had a refractive index of 1.5131 at 20° C. It contained by analysis 82.32% of carbon, 10.47% of hydrogen, and 6.90% of nitrogen.

This compound exhibits considerable activity as a local anesthetic.

In the same way other secondary amines are reacted with formaldehyde and α-methylstyrene or other hydrocarbon having a vinylidine group to give unsaturated tertiary amines. Thus there may be used dipropylamine, dibutylamine, diamylamine, and the like, or such secondary amines as octylmethylamine, dodecylmethylamine, benzylmethylamine, or dicyclohexylamine, these being equivalent in the process of this invention.

*Example 3*

A mixture of 55 parts of tetramethylmethylenedaimine and 200 parts of glacial acetic acid was cooled and stirred. Thereto was added 100 parts of sulfuric acid followed by 52 parts of styrene. The resulting mixture was heated under reflux for five hours. The reaction mixture was worked up as in the previous example. The product was obtained in a 41 part fraction at 121°–124° C./25 mm. It had a refractive index of 1.5096 at 20° C. and corresponded in composition to dimethylaminophenylpropene, $C_6H_5CH=CHCH_2N(CH_3)_2$.

*Example 4*

A solution of 68 parts of α-pinene and 51 parts of tetramethylmethylenediamine in 700 parts of glacial acetic acid was refluxed for 30 hours. From the reaction mixture there was distilled 500 parts of acetic acid. The residual material was poured into 700 parts of water. This aqueous mixture was extracted with three portions of 250 parts each of benzene. The aqueous layer was made alkaline by the addition of 30% sodium hydroxide solution. The oil which separated was taken up with toluene. The toluene solution was dried over calcium sulfate and distilled. The fraction taken at 120°–130° C./18 mm. was the desired product from pinene, formaldehyde, and dimethylamine. It contained by analysis 80.13% of carbon, 11.34% of hydrogen and 7.3% of nitrogen. For the compound $C_{13}H_{23}N$ or

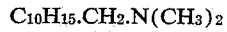

$$C_{10}H_{15}.CH_2.N(CH_3)_2$$

the corresponding theoretical values are 80.76%, 11.99%, and 7.25%, respectively. The refractive index of the product was 1.4819 at 24° C.

*Example 5*

To a mixture of 55 parts of tetramethylmethylenediamine and 200 parts of glacial acetic acid there were added 95 parts of sulfuric acid and 56 parts of diisobutylene. The resulting mixture was heated under reflux for five hours, allowed to cool, and left standing for 16 hours. The reaction mixture was poured into 750 parts of water. The aqueous mixture was extracted with three 160 part portions of benzene. The aqueous layer was taken and made alkaline with 25% sodium hydroxide solution to free the amine, which was extracted with two 160 part portions of benzene. Distillation of the benzene extract yielded 31 parts of unsaturated amine, $C_8H_{15}.CH_2.N(CH_3)_2$ as a fraction distilling at 87°–92° C./25 mm. It had a refractive index of 1.4389 at 20° C.

*Example 6*

A mixture of 51 parts of tetramethylmethylenediamine, 600 parts of glacial acetic acid, 68 parts of camphene, and 75 parts of sulfonated styrene-divinylbenzene copolymer, which had been washed with acetic acid and acetic anhydride, was stirred and heated under reflux for eight hours. There was distilled from the reaction mixture 500 parts of acetic acid. The residual material in the still was poured into 1000 parts of an aqueous 10% sulfuric acid solution. The aqueous mixture was filtered to remove the ion exchange resin. The filtrate was extracted three times with 200 ml. portions of benzene. The extracted aqueous solution was made alkaline with aqueous 30% sodium hydroxide solution. The amine which separated was taken up with toluene and dried over anhydrous potassium carbonate. The toluene solution was distilled. A fraction was obtained at 110°–120° C./15 mm. which corresponded in composition to the desired unsaturated amine, $C_{10}H_{15}.CH_2N(CH_3)_2$. It contained by analysis 80.36% of carbon, 12.08% of hydrogen, and 7.15% of nitrogen. Theoretical values are 80.76%, 11.99%, and 7.25%, respectively. The product had a refractive index, $n_D^{24}$, of 1.4795.

*Example 7*

There were mixed with cooling 87 parts of morpholine and 300 parts of glacial acetic acid. Thereto were added 45 parts of 85% phosphoric acid and 31 parts of paraformaldehyde. The mixture was heated until the paraformaldehyde had dissolved. Then 118 parts of α-methylstyrene was added and the mixture was heated under reflux for 16 hours. From the reaction mixture acetic acid was distilled until 200 parts had been taken off. The residual liquid was poured into 600 parts of water. The aqueous mixture was extracted with toluene. The water layer was taken and made alkaline with 30% sodium hydroxide solution. The amine which separated was extracted with toluene. The toluene solution was dried over potassium carbonate and was distilled. The fraction taken at 175°–170° C./15 mm. corresponded to the desired condensate,

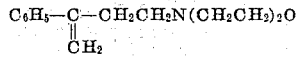

It contained by analysis 76.75% of carbon, 8.72% of hydrogen, and 6.58% of nitrogen. Theoretical values for $C_{14}H_{19}ON$ are 77.38%, 8.81%, and 6.45%, respectively. The refractive index of the product is 1.5439 at 20° C. When this compound is applied to dyed acetate rayon, it acts as a gas-fading inhibitor.

An equivalent weight of piperidine or pyrrolidine or other cyclic secondary amine, such as 2,6-dimethylmorpholine, may be substituted in the above procedure. The product from piperidine is N-(3-phenyl-3-butenyl) piperidine, while that from pyrrolidine is N-(3-phenyl-3-butenyl) pyrrolidine. These compounds are also gas fading inhibitors.

*Example 8*

A mixture of 68 parts of dipentene, 110 parts of tetramethylmethylenediamine, 330 parts of glacial acetic acid, and 20 parts of 85% phosphoric acid was stirred and heated under reflux for two hours. The reaction mixture was poured into 1500 parts of water. The aqueous mixture was extracted with toluene. The water layer was made alkaline with aqueous 30% sodium hydroxide solution. The amine thus freed was taken up with toluene. The toluene layer was dried over anhydrous potassium carbonate and distilled to yield 26 parts of a product which came over at 110°–122° C./10 mm. It corresponded in composition to $C_{10}H_{15}.CH_2.N(CH_3)_2$. This compound exhibits local anesthetic action.

*Example 9*

There were added with stirring and cooling 200 parts of glacial acetic acid to 60 parts of tetramethymethylenediamine followed by 100 parts of sulfuric acid. The resulting mixture was placed in a stainless steel rocking autoclave, which was then charged with 36 parts of propylene. The reaction mixture was heated at 135° C. for two hours, during which time the pressure in the autoclave rose to 500 p. s. i. and dropped to 100 p. s. i. as the reaction proceeded. The reaction mixture was taken from the autoclave and subjected to distillation under reduced pressure to remove most of the acetic acid. The residue from this distillation was poured into 500 parts of water. This aqueous mixture was extracted with ether. It was then made alkaline by addition of aqueous 50% sodium hydroxide solution with cooling to keep the temperature below 30° C. The resulting mixture was extracted with ether to take up the amine. The ether extract was dried over potassium carbonate and distilled to yield 20 parts of unsaturated amine. The main fraction was taken at 76°–78° C. It had a refractive index, $n_D^{25}$, of 1.3994 and a neutral equivalent of 97. This product consisted of butenyldimethylamines, for which the theoretical neutral equivalent is 97. This product is useful as a corrosion inhibitor and absorbent for carbon dioxide, hydrogen sulfide, and other acid gases, and chemical intermediates.

Another fraction was distilled at 120°–130° C. This had a neutral equivalent of 134. This is apparently the amine from propylene dimer, heptenyldimethylamine.

*Example 10*

There were mixed with cooling 240 parts of glacial acetic acid and 57 parts of tetramethylmethylenediamine and thereto with good stirring and cooling there were slowly added 50 parts of concentrated sulfuric acid, followed by 50 parts of tert.-butyl alcohol. The resulting mixture was heated under reflux for 15 hours. Acetic acid was distilled from the reaction mixture under reduced pressure. The residual liquid was poured into 500 parts of water. The aqueous mixture was extracted with ether. The aqueous layer was separated and, while the temperature thereof was kept below 35° C., was rendered alkaline by the addition of aqueous 30% sodium hydroxide solution. The amine was extracted therefrom with ether. The ether extract was dried over anhydrous potassium carbonate and distilled to yield 18 parts of pentenyldimethylamine, which came over at 100°–105° C. The distillate had a refractive index, $n_D^{25}$, of 1.4190 and a neutral equivalent of 108. The theoretical neutral equivalent is 111. This compound acts as a corrosion inhibitor.

This example illustrates how a tertiary alcohol may be used to supply a tertiary olefin. In place of such alcohol there may be used a tertiary halide, which under conditions of reaction also supplies an olefin. An important example of such halide is chlorocumene in which the chlorine is in the alkyl group. This compound yields the unsaturated hydrocarbon and is thus equivalent thereto and permits an economy in not requiring a separate dehydrohalogenating step.

*Example 11*

There were dissolved with cooling 16 parts of paraformaldehyde in 60 parts of N-benzylmethylamine. Thereto 200 parts of glacial acetic acid and then 90 parts of concentrated sulfuric acid were added slowly with cooling, followed by 52 parts of styrene. The mixture was heated under reflux for 15 hours. It was then cooled, and poured into 1000 parts of water. The acid-insoluble material was extracted with three 250 part portions of benzene. The aqueous layer was then made basic with concentrated ammonium hydroxide. The amine which separated was taken up in toluene. The toluene solution was dried and distilled under reduced pressure. At 147°–157° C./1.5 mm. a fraction of 21 parts was taken off. It was a colorless mobile liquid having a refractive index of 1.5550 at 25° C. which correspond in composition to N-cinnamyl-N-methylbenzylamine. It is quite effective as a corrosion inhibitor.

*Example 12*

To 54 parts of tetramethylmethylenediamine there were added with stirring and cooling 200 parts of glacial acetic acid and then 190 parts of sulfuric acid. There was then added a hexapropylene fraction to an amount of 126 parts. The mixture was heated and stirred at 110°–120° C. for 16 hours. It was cooled and poured into ice water. Two layers formed and were separated. The upper layer amounted to 45 parts. The lower aqueous layer was extracted with three 250 part portions of benzene. It was then made alkaline with ammonium hydroxide solution. An organic layer formed. It was taken up with toluene and separated. The toluene was distilled off and the product separated by distillation. At 95°–105° C./1.5 mm. there was obtained a fraction which corresponded fairly well in composition to nonadecenyldimethylamine. It had a neutral equivalent of 332. This compound acts as a corrosion inhibitor.

*Example 13*

There were dissolved with cooling 16 parts of paraformaldehyde in 60 parts of N-benzylmethylamine. Thereto 200 parts of glacial acetic acid and then 28 parts of 85% orthophosphoric acid were added, followed by 59 parts of α-methylstyrene. The mixture was heated under reflux for 15 hours. It was then cooled and poured into 1500 parts of water. The acid-insoluble material was extracted with three 250 part portions of benzene. The aqueous layer was then made alkaline with concentrated ammonium hydroxide. The amine which separated was taken up in toluene. The toluene solution was dried and distilled under reduced pressure. At 140°–150° C./1.3 mm. a fraction of 48 parts was taken off. It was a colorless mobile liquid having a neutral equivalent of 252 and a refractive index of 1.5615 at 25° C. It corresponded in composition to 1-N-methyl-N-benzylamino-3-phenyl-3-butene.

*Example 14*

To 52 parts of tetramethylmethylenediamine there was added with cooling a portion of 200 parts of glacial acetic acid. With the temperature of this mixture at 60° C. there were added 63 parts of β-pinene. An exothermic reaction ensued with the temperature rising to 90° C. After the exothermic reaction subsided, the reaction mixture was heated under reflux for two hours. It was then poured into water and the water mixture was extracted with benzene to remove materials insoluble in the acidic water solution. This solution was made alkaline with aqueous 30% sodium hydroxide solution. Amine separated, was taken up with toluene, and was distilled. At 133°–143° C./30 mm. a fraction of colorless oil was obtained which corresponded closely in composition to $C_{10}H_{15}.CH_2N(CH_3)_2$. It had a refractive index, $n_D^{25}$, of 1.4771 and a neutral equivalent of 192 (theory 193).

*Example 15*

A mixture of 75 parts of 76% aqueous dimethylamine sulfate solution, 17 parts of paraformaldehyde, 100 parts of glacial acetic acid, and 66 parts of para-methyl-alpha-methylstyrene was stirred and heated under reflux for six hours. After being cooled, the mixture was poured into 500 parts of water and extracted with three portions each of 300 parts of benzene. The aqueous layer was made basic with concentrated ammonium hydroxide solution and extracted with 200 parts of benzene. The benzene extract was washed with water and the benzene was removed by distillation. Distillation of the residual liquid yielded 52 parts of paratolylbutenyldimethylamine distilling at 115°–120° C./6 mm., having a refractive index, $n_D^{25}$, of 1.5209. It contained by analysis 82.10% of carbon, 10.26% of hydrogen, and 7.36% of nitrogen. This compound is an effective corrosion inhibitor.

*Example 16*

A mixture of 60 parts of diethylamine sulfate, 17 parts of paraformaldehyde, 100 parts of glacial acetic acid, and 66 parts of para-methyl-alpha-methylstyrene was refluxed for eight hours. After being cooled, the mixture was poured into 500 parts of water and extracted with three portions each of 300 parts of benzene. The aqueous layer was made basic with concentrated ammonium hydroxide solution and extracted with 200 parts of benzene. The benzene extract was washed with water and the benzene was removed by distillation. Distillation of the residual liquid yielded 36 parts of para-tolylbutenyldiethylamine, distilling at 110°–115° C./2 mm., and having a refractive index, $n_D^{25}$, of 1.5161. The compound as obtained contained by analysis 82.4% of carbon, 10.9% of hydrogen, and 6.44% of nitrogen. Corresponding theoretical values are 82.89%, 10.67%, and 6.44% respectively.

*Example 17*

Thirty-six parts of pyrrolidine were added slowly with stirring and cooling to 200 parts of glacial acetic acid. Thirty parts of 85% orthophosphoric acid were added followed by 17 parts of paraformaldehyde. Sixty-six parts of para-methyl-alpha-methylstyrene were then added and the mixture was stirred and refluxed for 20 hours. After being cooled, the mixture was diluted with 500 parts of water and extracted with three portions each of 200 parts of benzene. The aqueous layer was made basic with excess concentrated ammonium hydroxide solution. The upper layer of crude para-tolylbutenylpyrrolidine was diluted with 200 parts of benzene, separated, and washed with water. The benzene was removed from the extract by distillation and the residual liquid was distilled to yield 16 parts of pure para-tolylbutenylpyrrolidine, distilling at 125°–130° C./2 mm. and having a refractive index, $n_D^{25}$, of 1.5384. By analysis the compound obtained contained 83.0% of carbon, 9.76% of hydrogen, and 6.3% of nitrogen. Corresponding theoretical values are 83.66%, 9.83%, and 6.51% respectively.

*Example 18*

Forty-three parts of piperidine were added slowly with stirring and cooling to 200 parts of glacial acetic acid. Thirty parts of 85% orthophosphoric acid were added, followed by 17 parts of paraformaldehyde. Sixty-six parts of para-methyl-alpha-methyl-styrene were then added and the mixture was stirred and heated under reflux for 20 hours. After being cooled, the mixture was diluted with 500 parts of water and extracted with 3 portions each of 200 parts of benzene. The aqueous layer was made basic with excess concentrated ammonium hydroxide solution. The upper layer of crude para-tolylbutenylpiperidine was diluted with 200 parts of benzene, separated, and washed with water. The benzene was distilled from the extract and the residual liquid was distilled to yield 36 parts of pure para-tolylbutenylpiperidine which is clear, colorless liquid boiling at 145°–148° C./4 mm. and has a refractive index, $n_D^{25}$, of 1.5363. This compound contained by analysis 83.3% of carbon, 10.4% of hydrogen, and 5.82% of nitrogen (83.78%, 10.11%, and 6.11% by theory).

*Example 19*

Forty-four parts of morpholine were added slowly with stirring and cooling to 200 parts of glacial acetic acid. Thirty parts of 85% orthophosphoric acid were added followed by 17 parts of paraformaldehyde. Sixty-six parts of para-methyl-alpha-methyl-styrene were then added and the mixture was stirred and refluxed for 20 hours. After being cooled, the mixture was diluted with 500 parts of water and extracted with three portions each of 200 parts of benzene. The aqueous layer was made basic with excess concentrated ammonium hydroxide solution. The upper layer of crude para-tolylbutenylmorhpoline was diluted with 250 parts of benzene, separated, and washed with water. The benzene was removed from the extract by distillation and the residual liquid was distilled to yield 57 parts of para-tolylbutenylmorpholine, distilling at 160°–165° C./4 mm., and having a refractive index, $n_D^{25}$, of 1.5407. The product contains by analysis 78.4% of carbon, 9.23% of hydrogen, and 5.86% of nitrogen. The theoretical value for this compound are 77.9%, 9.15%, and 6.06% respectively.

The process of this invention, reacting an olefinically unsaturated hydrocarbon, formaldehyde, and secondary amine, permits the preparation of basic nitrogen compounds, one type of which includes unsaturated amines, from readily available starting materials by a relatively simple and economical procedure. The compounds thus prepared are useful as surface active agents, corrosion inhibitors, flotation agents, antioxidants, oil additives, bactericides, fungicides, textile finishing agents, chemical intermediates, and the like.

From the reaction of secondary amines, formaldehyde, and substituted styrenes, there are available new alkylamines. Those of most present interest are the tertiary amines of the formula

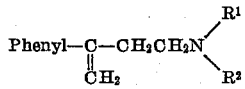

where $R^1$ and $R^2$ are individually alkyl groups, particularly those of not over 12 carbon atoms, and taken together saturated divalent aliphatic chains of four to five carbon atoms forming a heterocycle with the nitrogen.

I claim:

1. A process for preparing organic tertiary amino compounds which comprises reacting in the presence of a catalyst from the class consisting of sulfuric, arylsulfonic, alkanesulfonic, and phosphoric acids and sulfonated cation-exchange resins in hydrogen form a mono-olefinically unsaturated hydrocarbon having a vinylidene group, formaldehyde, and a secondary amine having an —NH group as the sole group reacting with formaldehyde and having N-substituents which are members of the class consisting of saturated divalent aliphatic chains having a length of four to five atoms which form a heterocycle with the amino nitrogen and lower alkyl, and benzyl groups.

2. A process for preparing organic tertiary amino compounds which comprise reacting in the presence of sulfuric acid as catalyst a mono-olefinically unsaturated hydrocarbon having a vinylidene group, formaldehyde, and a secondary amine, the N-substituents of which are members of the class consisting of saturated divalent aliphatic chains having a length of four to five atoms which form a heterocycle with the amino nitrogen and lower alkyl, and benzyl groups.

3. A process for preparing olefinically unsaturated amines which comprises reacting in the presence of a catalyst from the class consisting of sulfuric, arylsulfonic, alkanesulfonic, and phosphoric acids and sulfonated cation-exchange resins in hydrogen form a mono-olefinically unsaturated hydrocarbon having a vinylidene group, formaldehyde, and a dialkylamine having lower alkyl groups.

4. The process of claim 3 wherein the amine is dimethylamine and the catalyst is sulfuric acid.

5. A process for preparing olefinically unsaturated amines which comprises reacting in the presence of a catalyst from the class consisting of sulfuric, arylsulfonic, alkanesulfonic, and phosphoric acids and sulfonated cation-exchange resins in hydrogen form a mono-olefinically unsaturated hydrocarbon having a vinylidene grouping, formaldehyde, and a secondary heterocyclic amine having attached to the nitrogen thereof and forming a heterocycle therewith a saturated divalent aliphatic chain having a length of four to five atoms.

6. The process of claim 5 wherein the amine is morpholine.

7. The process of claim 6 wherein the catalyst is phosphoric acid.

8. A process for preparing olefinically unsaturated amines which comprises reacting in the presence of a catalyst from the class consisting of sulfuric, arylsulfonic, alkanesulfonic, and phosphoric acids and sulfonated cation-exchange resins in hydorgen form an unsaturated hydrocarbon having a vinylidene grouping, formaldehyde, and methylbenzylamine.

9. As a composition of matter, unsaturated tertiary amines of the formula

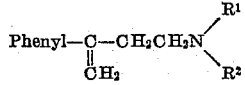

wherein $R^1$ and $R^2$ are members of the class consisting of lower alkyl groups and saturated divalent aliphatic chains of four to five atoms which form a heterocycle with the nitrogen.

10. N-(3-phenyl-3-butenyl)morpholine.

References Cited in the file of this patent
UNITED STATES PATENTS 2,647,117    Hartough _____ July 28, 1953

OTHER REFERENCES

Beilstein's Handbook of Org. Chem., vol. 12, p. 1196 and vol. 9, page 811 (1926).